US009581460B1

(12) United States Patent
McNew et al.

(10) Patent No.: US 9,581,460 B1
(45) Date of Patent: Feb. 28, 2017

(54) APPARATUS AND METHOD TRANSITIONING BETWEEN DRIVING STATES DURING NAVIGATION FOR HIGHLY AUTOMATED VECHICLE

(71) Applicant: TOYOTA MOTOR ENGINEERING & MANUFACTURING NORTH AMERICA, INC., Erlanger, KY (US)

(72) Inventors: John-Michael McNew, Ann Arbor, MI (US); Kazutoshi Ebe, Novi, MI (US); Danil V. Prokhorov, Canton, MI (US); Michael J. Delp, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 0 days.

(21) Appl. No.: 15/083,648

(22) Filed: Mar. 29, 2016

(51) Int. Cl.
*G01C 21/36* (2006.01)
(52) U.S. Cl.
CPC ................. *G01C 21/3667* (2013.01)
(58) Field of Classification Search
CPC .................................................. G01C 21/3667
USPC ......................................................... 701/428
See application file for complete search history.

(56) References Cited

U.S. PATENT DOCUMENTS

| 8,527,199 | B1 | 9/2013 | Burnette et al. |
| 9,008,961 | B2 | 4/2015 | Nemec et al. |
| 9,188,985 | B1 | 11/2015 | Hobbs et al. |
| 2013/0211656 | A1 | 8/2013 | An et al. |
| 2013/0345980 | A1* | 12/2013 | van Os ............... G01C 21/3626 701/538 |
| 2015/0253778 | A1 | 9/2015 | Rothoff et al. |
| 2016/0209216 | A1* | 7/2016 | Naylor .................... G01C 21/20 |
| 2016/0209230 | A1* | 7/2016 | Nagy .................. G01C 21/3664 |
| 2016/0216130 | A1* | 7/2016 | Abramson .......... G01C 21/3626 |
| 2016/0223355 | A1* | 8/2016 | Habib ................. G01C 21/3667 |

FOREIGN PATENT DOCUMENTS

| WO | 2015/049231 A1 | 4/2015 |
| WO | WO 2015/111508 A1 | 7/2015 |
| WO | WO 2015/129366 A1 | 9/2015 |
| WO | WO 2015/162784 A1 | 10/2015 |
| WO | WO 2016/133325 A1 | 8/2016 |

* cited by examiner

*Primary Examiner* — McDieunel Marc
*Assistant Examiner* — James E Stroud
(74) *Attorney, Agent, or Firm* — Oblon, McClelland, Maier & Neustadt, L.L.P.

(57) ABSTRACT

A navigation apparatus for an autonomous vehicle includes circuitry configured to receive at least one route between a start location and a destination, display the at least one route on a first screen that allows selection of a first set of routes from the at least one route, receive a plurality of characteristics corresponding to each of the at least one route. Each characteristic of the plurality of characteristics is associated with a measure and a longest block within which each characteristic can be performed continuously. The circuitry further configured to divide a route of the at least one route to generate a plurality of segments based on the plurality of characteristics, and display the first set of routes, the plurality of characteristics corresponding to the first set of routes, the measure and the longest block corresponding to the plurality of characteristics on a second screen.

16 Claims, 8 Drawing Sheets

APPARATUS AND METHOD TRANSITIONING BETWEEN DRIVING STATES DURING NAVIGATION FOR HIGHLY AUTOMATED VECHICLE

BACKGROUND

Field of the Disclosure

This application relates generally to improvements in highly automated or autonomous vehicles. More particularly the present disclosure relates to applying driver preferences or historic driving performance in determining an optimized route for highly automated or autonomous vehicles.

Description of the Related Art

In a conventional navigation system, a driver can input a destination address and the navigation system determines the directions to the destination based on the map stored or accessible to the conventional navigation system. The conventional navigation system is equipped with a global positioning sensor (GPS) to determine a current position of the vehicle. Based on the current position, the conventional navigation system guides the driver to the destination, using audible and visual instructions. As more than one route is available between the current position and the destination, the conventional navigation system choses which route or routes to offer the driver. Often, the route is selected by considering factors of importance for non-autonomous driving such as travel distance or travel time. Furthermore, some navigation systems integrate traffic, road event such as repair or accident related information into the directions, thereby giving the driver flexibility to select a less congested routes.

The conventional navigations, although helpful and suitable for a non-autonomous vehicle, are not adaptive and do not account for factors of interest for autonomous driving. For example, the conventional navigation system routing may not be able to account for hands free time or sleep time, which are some of the enhanced capabilities of the autonomous vehicle over the non-autonomous vehicle, during a route determination and selection.

Autonomous vehicles are a next generation type of automotive vehicle with highly increased functionalities and vehicle performance in terms of driving automation. Autonomous vehicles can not only improve driving performance and overall vehicle performance, but also allow a driver to sleep, take hands off the steering wheel, take eyes off the road, etc. in certain situations. To enable such increased capabilities of a vehicle, several smart components including smart sensors, and communication with driver and other vehicles is necessary. Among the increased capabilities an efficient routing or navigation system needs to be included, as conventional navigation systems have limited capabilities and pose several limitations. As such, there remains a continuing need to provide improved navigation systems for autonomous vehicles.

SUMMARY

According to an embodiment of the present disclosure, there is provided a navigation apparatus. The navigation apparatus for an autonomous vehicle includes circuitry configured to receive, via a network, at least one route between a start location and a destination, display the at least one route on a first screen that allows selection of a first set of routes from the at least one route, receive, via the network, a plurality of characteristics corresponding to each of the at least one route, each characteristic of the plurality of characteristics is associated with a measure and a longest block within which each characteristic can be performed continuously. Further the circuitry is configured to divide a route of the at least one route to generate a plurality of segments based on the plurality of characteristics, a first segment is highlighted with a first identifier corresponding to a first characteristic of the plurality of characteristics and a second segment is highlighted with a second identifier corresponding to a second characteristic of the plurality of characteristics, and display the first set of routes, the plurality of characteristics corresponding to the first set of routes, the measure and the longest block corresponding to the plurality of characteristics on a second screen.

Further, according to an embodiment of the present disclosure, there is provided a method for navigation of an autonomous vehicle. The method includes receiving, via a network, at least one route between a start location and a destination, displaying, using a processing circuitry, the at least one route on a first screen that allows selection of a first set of routes from the at least one route, and receiving, via the network, a plurality of characteristics corresponding to each of the at least one route, each characteristic of the plurality of characteristics is associated with a measure and a longest block within which each characteristic can be performed continuously. The method further includes dividing, using the processing circuitry, a route of the at least one route to generate a plurality of segments based on the plurality of characteristics, a first segment is highlighted with a first identifier corresponding to a first characteristic of the plurality of characteristics and a second segment is highlighted with a second identifier corresponding to a second characteristic of the plurality of characteristics, and displaying, using the processing circuitry, the first set of routes, the plurality of characteristics corresponding to the first set of routes, the measure and the longest block corresponding to the plurality of characteristics on a second screen.

Further, according to an embodiment of the present disclosure, there is provided a non-transitory computer-readable medium which stores a program which, when executed by a computer, causes the computer to perform the method for navigation of an autonomous vehicle, as discussed above.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "proximate," "minor," and similar terms generally refer to ranges that include the identified value within a margin of 20%, 10% or preferably 5% in certain embodiments, and any values therebetween.

Figure 1:
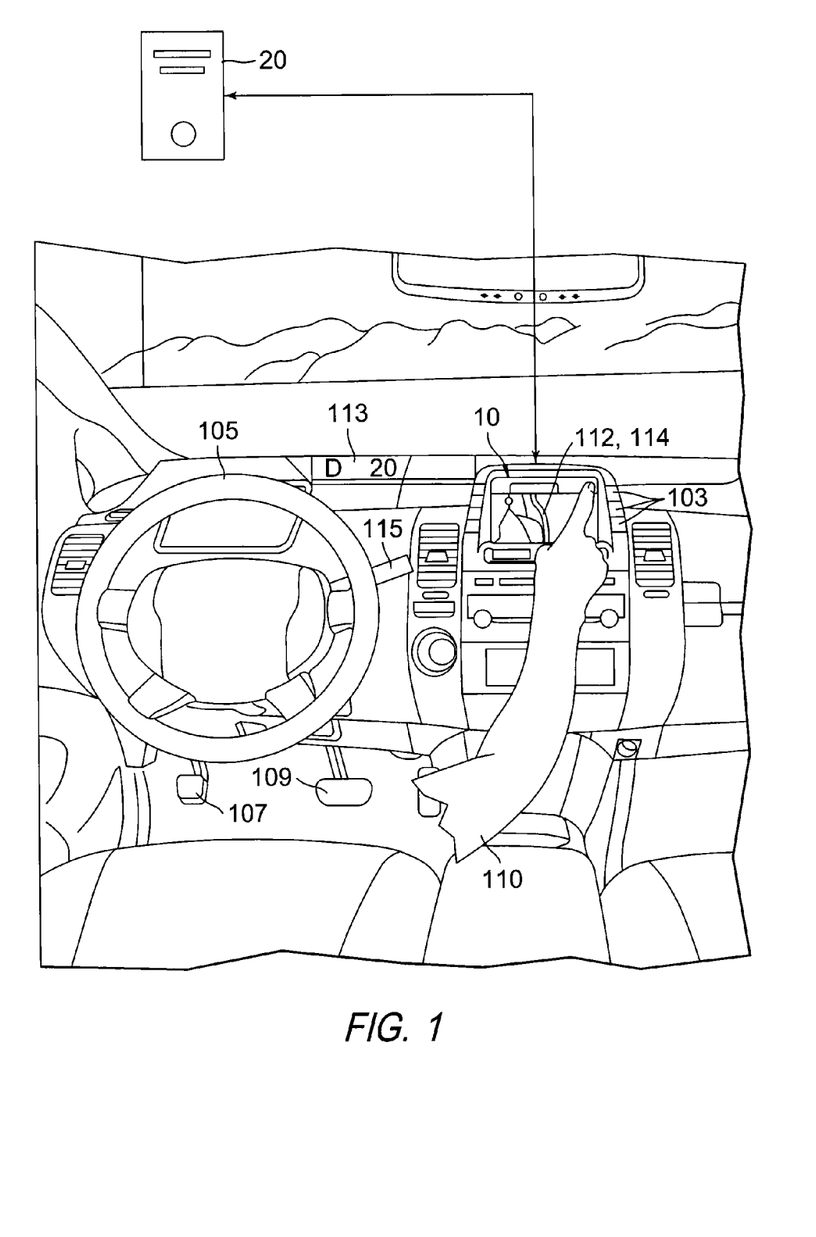
FIG. 1 is an interior view of an autonomous vehicle with a navigation apparatus according to an exemplary embodiment of the present.

FIG. 1 illustrates a navigation apparatus for an autonomous vehicle according to an exemplary embodiment of the present. The autonomous vehicle includes a navigation apparatus 10 and various electronic and mechanical components. While certain aspects of the disclosure are particularly useful in connection with specific types of vehicles, the autonomous vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. The autonomous vehicle can refer to a fully autonomous vehicle, semi or partially autonomous vehicle and vehicles equipped with various advanced driver assist system (ADAS) such as adaptive cruise control and lane departure alert. Further, the autonomous vehicle may include all of the features of a non-autonomous vehicle, for example: a steering apparatus such as steering wheel 105; a navigation apparatus 10 having a navigation display 101 with a touch screen 102; and a driving mode selector apparatus such as a mode shifter 115. The vehicle may also have various user input devices, such as a mode shifter 115, the touch screen 102 or button inputs 103 for activating or deactivating one or more autonomous driving modes and for enabling a driver (or a passenger) 120 to provide information such as a navigation destination to the navigation apparatus 10. In one embodiment, the navigation apparatus 10 can be integrated with the dashboard of the autonomous vehicle. Alternatively, the navigation apparatus 10 can be detachably attached to a dashboard or windshield of the autonomous vehicle.

The autonomous vehicle can optionally include more than one display. For example, the vehicle may include a second display 113 for displaying information regarding the status of the autonomous vehicle, navigation status information obtained from the navigation apparatus 10, or other vehicle status information received from a computer such as an electronic control unit (ECU) installed on the autonomous vehicle. The second display 113, in the present example, displays a driving mode "D" and a speed "20" indicating that the vehicle is presently in a drive mode and is moving at 20 miles per hour. In one embodiment, when the drive switches autonomous mode, the second display 113 can display the driving mode as "AV" indicating the vehicle is in autonomous mode. Additional modes can include, for example, a hands free mode "HF", an eyes-off-road mode "EOR", autopilot, etc.

In one embodiment, the navigation apparatus 10 can also communicate with various components of the vehicle such as the vehicle's conventional ECU (not shown) and can send and receive information from various systems of the autonomous vehicle, for example, a brake pedal 107, an accelerator 109, and the steering wheel 105 to control the movement, speed, etc., of the autonomous vehicle.

The autonomous vehicle may also be equipped with a geographic position component such as a GPS receiver to determine the device's latitude, longitude and/or altitude position, an accelerometer, a gyroscope or another direction/speed detection devices to determine the direction and speed of the vehicle or changes thereto. Furthermore, the vehicle may also include components for detecting objects and conditions external to the vehicle such as other vehicles, obstacles in the roadway, traffic signals, signs, trees, etc. The detection system may include lasers, sonar, radar detection units (such as those used for adaptive cruise control), cameras, or any other detection devices which record data and send signal to the ECU. Furthermore, the autonomous vehicle can be equipped with a DSRC (direct short range communication) sensor, and AV (autonomous vehicle) penetration sensor, that allow detection of other autonomous vehicles within the range of the sensors and also enable communication with other autonomous vehicles. The AV penetration sensor can include light detection and ranging (LIDAR) that provides range or distance information and a stereo camera that allows for object recognition.

The aforementioned sensors can allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In one embodiment, the sensors described above can also receive input from sensors installed on a non-autonomous vehicle. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), precipitation sensors for automatic windshield wipers, etc.

The navigation apparatus 10, ECU or the server 20 can receive or transfer information to and from other computers. For example, a map stored on the server 20 may be received or transferred from the server 20 to the navigation apparatus 10, the sensor data collected from the sensors of the autonomous vehicle can be transmitted to the server 20 for processing. Also, data collected from other vehicles can be stored in the database of the server 20 and the data can be used for navigation purposes. As such, sensor information, and navigation related functions (described with reference to FIGS. 2A-2C and 3-5) can be implemented using a central architecture, where the information from aforementioned sensors and the navigation related functions are processed by a single controller such as the ECU. Alternatively, a distributed architecture can be used, in which the navigation related functions are processed partially by the navigation apparatus 10 and partially by the server 20.

The navigation apparatus 10 can be a human machine interface (HMI) that allows user to view and select different routes from a start location to a destination based on certain characteristics of a route. The characteristics of a route refer to various states the driver 110 can occupy while the autonomous vehicle is in motion and other factors specific to the route. For example, the characteristics of the route can be driver states such as hands free, eyes-off-road, sleeping, reclining, forward seating, manual, eyes required to be on a dedicated clonable display etc., while other factors can be safety, travel time, travel distance, etc. The notion of the clonable display refers to a dedicated display onto which the driver can clone the route on an external device such as a smartphone or a tablet. The external device can be placed high on the dashboard, as such the timing for reengagement of the eyes once a warning is issued can be known more precisely than a general eyes-off-road state. So, there may be stretches of road where the eyes on the clonable display is allowed, but the eyes off the road is not. The HMI can include a software application executed on a controller of the navigation apparatus 10 to display more than one screen, which can be further configured to accept user inputs and display results. In various embodiments of the present disclosure, three screens are discussed by way of non-limiting examples to demonstrate various aspects of the present disclosure.

The different characteristics of the route determined by the navigation apparatus 10 can also enable the autonomous vehicle to be operated in a teammate mode. In the teammate mode the autonomous vehicle performs certain operation such as steering, acceleration, etc., without driver input along certain sections of the route, while in certain sections involving winding road, harsh weather, heavy traffic conditions, driving for pleasure, etc. the autonomous vehicle can pass the control over to the driver.

Figure 2A:
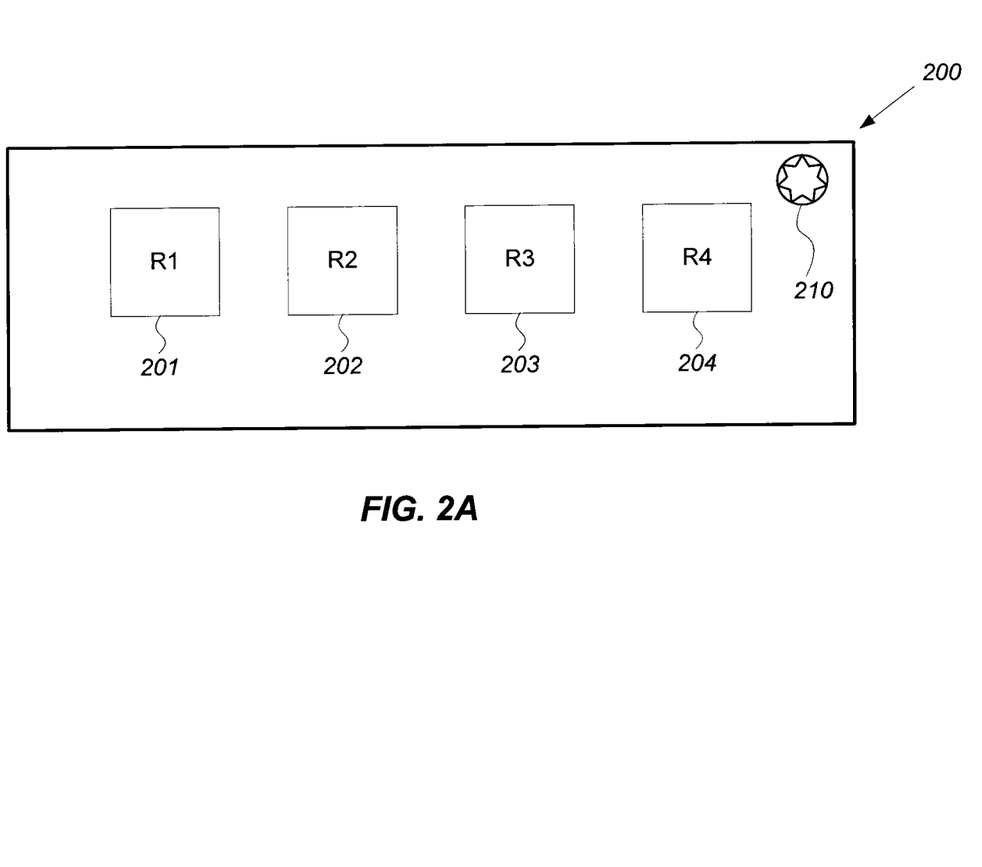
FIG. 2A illustrates a first screen of the navigation apparatus according to an exemplary embodiment of the present disclosure.

FIG. 2A illustrates a first screen 200 of the navigation apparatus 10 according to an exemplary embodiment of the present disclosure. The first screen 200 of the navigation apparatus 10 displays at least one route button such as route buttons 201, 202, 203, and 204 corresponding to the routes R1, R2, R3, and R4, respectively. The route buttons 201-204 can further display a summary of a route in the form of parameters such as a travel time, hands free time, scenery around the route, or an overview of a map with the route marked on the map. The routes R1-R4 can be determined by the server 20 that implements routing algorithms, route optimization algorithms, or other navigation algorithms as appropriate for the autonomous vehicle. Optionally, the first screen 200 can include a setting button 210 that allows a user to: select route preferences, display summary parameters in the route buttons 201-204, store a current route, add favorite routes, display special messages at particular points of interest during driving, etc. The aforementioned settings can also be taken into account by the server 20 while determining the routes.

The route buttons 201-204 can be selectively activated to further display the characteristics of each of the selected routes to assist the user in choosing a route to navigate to the destination. In one embodiment, the characteristics of each of the selected routes, can be displayed on a second screen 300 (further discussed with respect to FIG. 2B) to enable comparison between different routes. Alternatively or in addition, one or more routes (e.g., routes R1 and R4) can be selected by the user based on the summary of characteristics of the selected routes (e.g., routes R1 and R4). In certain embodiments, a route (e.g., R1) can be activated by double tapping the route button 201, by pressing and holding the route button 201, or other appropriate activation method.

Figure 2B:
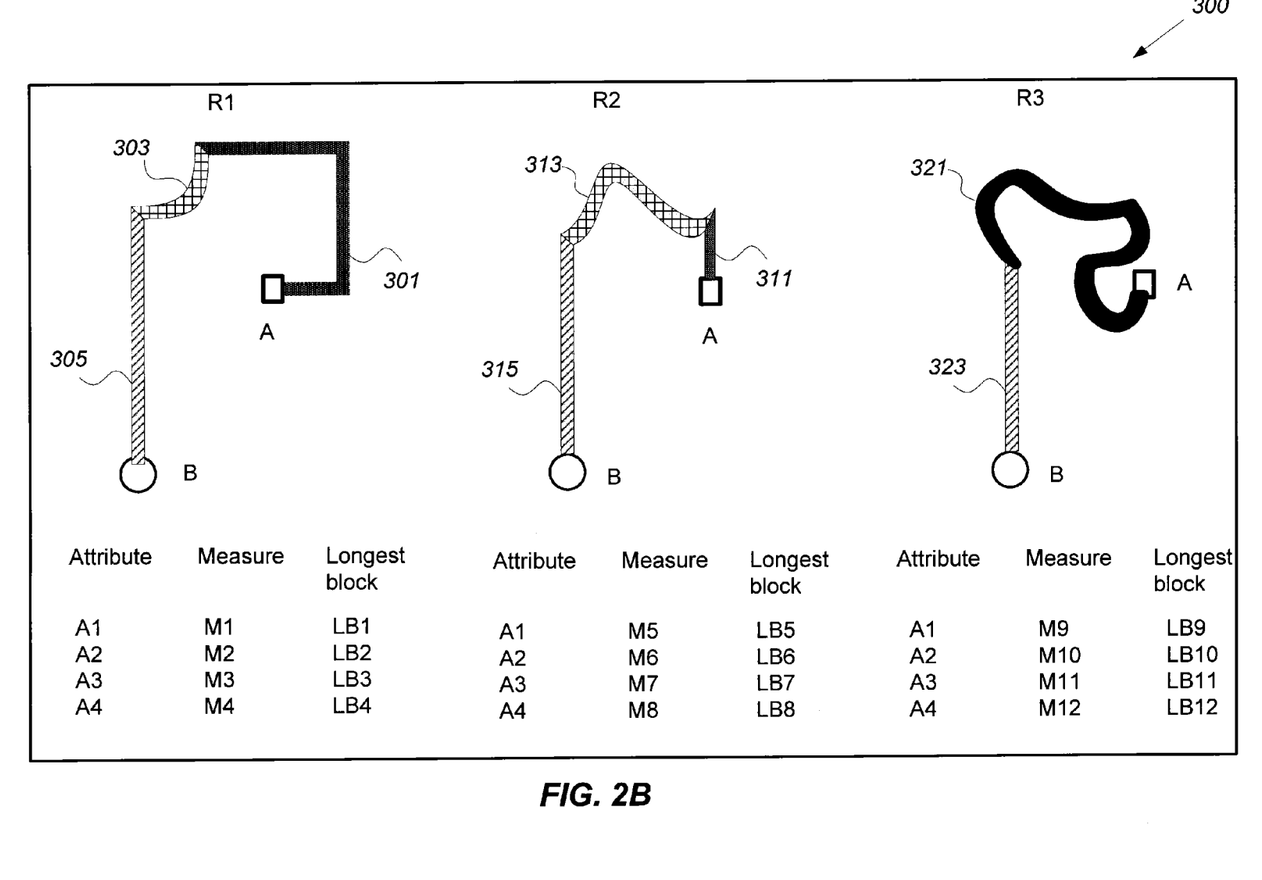
FIG. 2B illustrates a second screen of the navigation apparatus according to an embodiment of the present disclosure.

FIG. 2B illustrates a second screen 300 of the navigation apparatus 10 according to an embodiment of the present disclosure. The second screen 300 displays details of the selected routes (e.g., R1, R2, and R3). The details can include directions marked on a map and the characteristics of the selected routes and measures associated with the characteristics. Further, the characteristics of the selected routes can be marked on the map to provide visual instructions to the driver 110. The characteristics of the route can be, by way of non-limiting example, hands free, eyes-off-road, sleeping, reclining, forward seating, manual, safety, travel time, travel distance, scenery around the route, manual driving for pleasure, etc.

In FIG. 2B, the characteristics of the route are presented in a tabular format showing the attributes A1-A4 for each of the routes R1, R2 and R3. Further, each attribute A1, A2, A3 and A4 is associated with a measure M1, M2, M3 and M4, respectively, for route R1. The measure M1 (e.g., time in minutes) can be different from the measure M2 (e.g., distance in miles). Optionally, longest blocks LB1, LB2, LB3 and LB4 within a route (e.g., route R1) in which the attribute A1, A2, A3 and A4, respectively, can be performed without interruption, can be displayed. A longest block is a longest segment of a route, when a route is divided into multiple route segment, along which an attribute is performed continuously. For example, for route R1, the attribute A1 can be the sleeping state (or hands free state) of the driver 110 measured in time (or distance). The measure M1 corresponding to the attribute A1 can be 22 mins (or 22 miles).

The longest block LB1 of the sleeping state of the driver can be 5 mins (or 5 miles), which corresponds to approximately 22% of the measure M1. The attribute A2 can be the eyes-off-road state of the driver 110 measured in time (or distance). The measure M2 corresponding to the attribute A2 can be 20 mins (or 20 miles). The longest block LB2 of the eyes-off-road state of the driver can be 15 mins (or 15 miles). The attribute A3 can be the sleeping state of the driver 110 measured in time (or distance). The measure M3 corresponding to the attribute A3 can be 10 mins (or 10 miles). The longest block LB3 of the sleeping state of the driver can be 4 mins (or 4 miles). The attribute A4 can be the manual state of the driver 110 measured in time (or distance). The measure M4 corresponding to the attribute A4 can be 5 mins (or 5 miles). The longest block LB4 of the manual state of the driver can be 4 mins (or 4 miles). Similarly, additional attributes such as the travel time (e.g. 25 mins), the travel distance (e.g., 20 miles), the reclining, the seat forward, etc. can be displayed for the route R1.

Similarly, the characteristics of route R2, by way of non-limiting example, can be as follows. The attribute A1 (e.g., the sleeping or hands free state) can have the measure M5 (e.g., time in minutes) of 20 mins with a longest block LB5 of 15 mins. The attribute A2 (e.g., the eyes-off-road state) can have the measure M6 (e.g., time in minutes) of 7 mins with a longest block LB6 of 7 mins. The attribute A3 (e.g., the sleeping state) can have the measure M7 (e.g., time in minutes) of 7 mins with a longest block LB7 of 7 mins. The attribute A4 (e.g., the manual state) can have the measure M8 (e.g., time in minutes) of 5 mins with a longest block LB8 of 5 mins. Additionally, travel time (e.g., 22 mins), travel distance (e.g., 15 miles), reclining, seat forward, etc. can be displayed for the route R2.

Similarly, the characteristics of route R3, by way of non-limiting example, can be as follows. The attribute A1 (e.g., the sleeping or hands free state) can have the measure M9 (e.g., time in minutes) of 7 mins with a longest block LB9 of 7 mins. The attribute A2 (e.g., the eyes-off-road state) can have the measure M10 (e.g., time in minutes) of 0 mins with a longest block LB10 of 0 mins. The attribute A3 (e.g., the sleeping state) can have the measure M11 (e.g., time in minutes) of 0 mins with a longest block LB11 of 0 mins. The attribute A4 (e.g., the manual state) can have the measure M12 (e.g., time in minutes) of 12 mins with a longest block LB12 of 12 mins. Additionally, travel time (e.g., 19 mins), travel distance (e.g., 14 miles), reclining, seat forward, etc. can be displayed for the route R3.

As such, the driver can compare the travel times, measures related to attribute A1 and the longest block related to attribute A1 (i.e., sleeping time) for the routes R1, R2, and R3, respectively. The driver can decide to choose route R2, since the longest block LB5 of sleeping time is 14 mins out of 20 mins (the measure M5), although the total sleep time (the measure M1) for the route R1 is 22 mins, which is higher than the measure M5. The longest block LB1 of the attribute is 5 mins, since the route R1 may include multiple discontinuous segments of less than or equal to 5 mins, where the driver can occupy the sleeping state. On the other hand, the route R2 has the longest block LB5 of 14 mins, since the route R2 may include only two discontinuous segments of 14 mins and 6 mins where the driver can occupy the sleeping state.

The characteristics of the route (e.g., the attributes A1-A4) of the route R1) can be further used to divide the route (e.g., route R1) into more than one route segment. A route segment can be identified as a continuous sequence of road segments during which the driver is allowed to occupy a subset (one or more) of driving states. Further, each of the route segments can be highlighted by identifiers such as markers based on a color scheme. For example, the route R1 illustrates an overview of directions (on a map) from a start location A to a destination B and includes a first route segment 301, a second route segment 303, and a third route segment 305. The first route segment 301 may include, for example, three road segments on the same road or may include three different roads. The first route segment 301 can be marked in green indicating the driver 110 can occupy the sleeping (or hands free) state only. The second route segment 303 can be marked in red indicating the driver 110 can occupy the manual state only. The third route segment 305 can be marked in yellow indicating the driver 110 can occupy the hands free state and the eyes-off-road state and sleeping state.

Similarly for the route R2 illustrates an overview of directions (on a map) from the start point A to the destination B and further includes a fourth route segment 311, a fifth route segment 313, and a sixth route segment 315. The fourth route segment 311 can be marked in green, the fifth route segment 313 can be marked in red, the sixth route segment 315 can be marked in yellow.

Similarly for the route R3 illustrated with an overview of directions (on a map) from the start point A to the destination B and further includes a seventh route segment 321, and an eighth route segment 323. The seventh route segment 321 can be marked in red indicating the driver 110 can occupy the manual state only. The eighth route segment 323 can be marked in yellow indicating the driver 110 can occupy the hands free state and the eyes-off-road state.

Marking the route segments (e.g., the first route segment 301 and the fourth route segment 311) with identifying marks provides a visual guidance and a basis for comparison between different routes (e.g., route R1 versus route R3) to the driver 110 to choose an appropriate path according to his/her driving style or preference. The identifying markers can also be placed next to the respective attributes A1-A4.

Certain aspects of the route can be highlighted, particularly where the autonomous vehicle has access to detailed maps, which allow the autonomous vehicle to engage the autonomous mode. For example, certain areas along the route can have detailed maps of some streets stored in the database, while for some areas a detailed road map may not be available. Accordingly, the navigation apparatus 10 can highlight sections of the map (along the route) with a semi-transparent background color, for example, autonomous areas (identified based on availability of a detailed map) can be marked in a faint yellow background, while a non-autonomous area can be marked in blue.

Figure 2C:
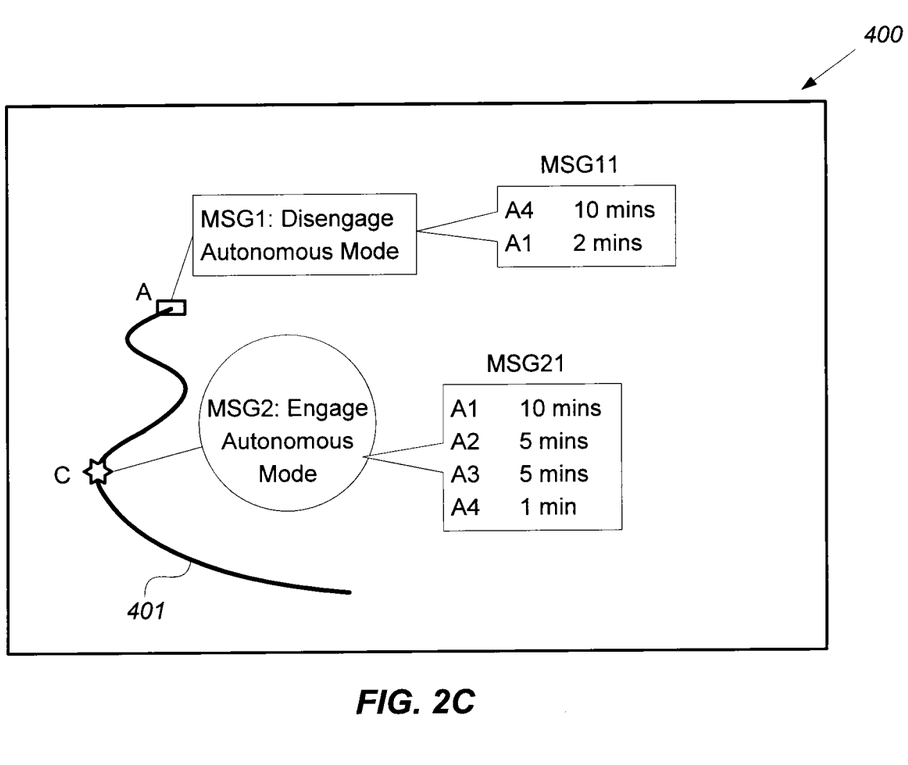
FIG. 2C illustrates a third screen of the navigation apparatus according to an embodiment of the present disclosure.

FIG. 2C illustrates a third screen 400 of the navigation apparatus 10 according to an exemplary embodiment of the present disclosure. The third screen 400 displays real-time directions and transition messages at transition points when the autonomous vehicle is in operation or moving. A transition point is a location at which the driver 110 should transition from one state to another. In many cases, a transition point occurs between two segments of a route. Thus, there is substantially the same number of segments as there are transition points. A transition message indicates a driver should occupy a particular state starting from the transition point. The transition message can further include an appended message, which displays characteristics of the route from a first transition point to the next transition point. Optionally, the details in the appended message can be ordered, for example in an ascending order or a descending order, based on the measures corresponding to the attributes (e.g., A1-A4). The transition points, the transition messages and the appended messages can be determined during the route generation by the server 20, or can be generated by the controller of the navigation apparatus 10.

In FIG. 2C, the third screen 400 illustrates a real-time route 401 (e.g., the route R1 selected by the driver 110) starting from the start location A, which can be the first transition point. At (or proximately at) the start location A, a first transition message MSG1 indicating "Disengage Autonomous Mode" or "Manual" state can be displayed. The first transition message MSG1 can be appended with additional details in a first appended message MSG11. The first appended message MSG11 displays the attributes A4 and A1 with the measures 10 mins and 2 mins, respectively, in descending order. The first appended message MSG11 indicates the driver 110 can occupy the manual state (represented by attribute A4 in one embodiment) for 10 mins and the hands free state (represented by attribute A1 in one embodiment) for 2 mins till a second transition point C. At (or proximately at) the second transition point C, a second transition message MSG2 indicating "Engage Autonomous Mode" can be displayed. Alternatively or in addition, the second transition message MSG2 can indicate "Hands free", "eyes-off-road", etc. The second transition message MSG2 can be appended with additional details in a second appended message MSG21. The second appended message MSG21 displays the attributes A1, A2, A3 and A4 with the measures are 10 mins, 5 mins, 5 mins, and 1 mins, respectively, in descending order. The second appended message MSG21 indicates the driver 110 can occupy the hands free state (represented by the attribute A1 in one embodiment) for 10 mins till a next transition point.

In one embodiment, the transition message and the appended message can be displayed together. In another embodiment, the third screen 400 can be configured to display the appended message upon activation of the transition message by tapping, for example. It can be appreciated by a person skilled in art that the configurations of the messages discussed in various embodiments are non-limiting examples and can be modified within the scope of the present disclosure.

The navigation apparatus 10 can also allow live updating of the allowed driver states based on sensors data, real-time traffic data and suggest rerouting. The live updating can be performed for one or more routes displayed on the second screen 300 or the route displayed on the screen 400. For instance, when the driver starts his/her commute, sleeping may be an allowed state along a selected route, but in an event of a road accident such as a truck jackknife, the traffic can be rerouted. As such, the navigation apparatus 10 can indicate to switch to the manual mode or re-plan the routes to avoid the truck jackknife. The autonomous vehicle includes sensors capable of confirming in real-time that the expected allowed state is correct.

The first screen 200, the second screen 300, and the third screen 400 can be displayed on a same display or on multiple displays. For example, one or more of the first screen 200, the second screen 300, and the third screen 400 can appear on the same display, may appear in a sequence one after the other on the same display, on multiple screens or combinations thereof.

Figure 3:
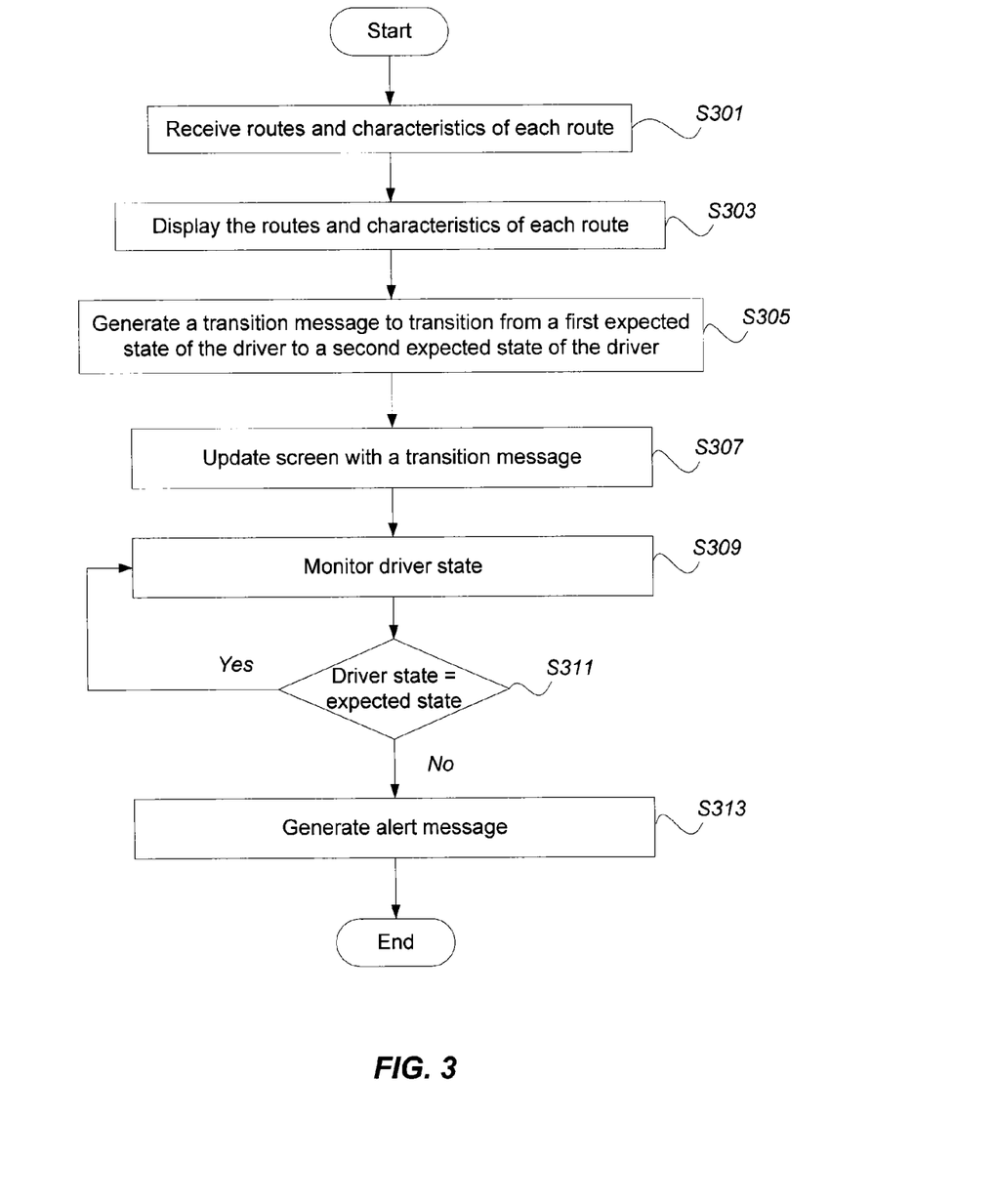
FIG. 3 is a flow chart of a process performed by the navigation apparatus according to an embodiment of the present disclosure.

FIG. 3 is a flow chart of a process performed by the navigation apparatus 10 according to an embodiment of the present disclosure. The process starts when at least one route from the starting location A to the destination B is determined and the navigation apparatus 10 receives a signal from the server 20. In step S301, the navigation apparatus 10 receives the routes (e.g., routes R1-R4) and the characteristics of the routes (e.g., the attributes A1-A4, the measures M1-M12, and the longest blocks LB1-LB12).

In step S303, the navigation apparatus 10 displays the routes (e.g., routes R1-R4) on the first screen 200 along with the characteristics and transition points of each route. The user can select one or more routes (e.g., routes R1, R2, and R3) to compare the characteristics of the selected routes (e.g., routes R1, R2, and R3). The selected routes and the characteristics of the selected routes (e.g., the attributes A1-A4, measures M1-M12, and longest blocks LB1-LB12) can be displayed on the second screen 300. Further, the second screen 300 includes the overview of directions highlighted with identifiers, as discussed with reference to FIG. 2B. After comparing the routes based on the information on the first screen 200 or on the second screen 300, the user can activate a route (e.g., route R1) to navigate to the destination B. Upon activation of a route (e.g., route R1), the third screen 400 can be displayed, where the real-time directions and instructions are conveyed to the user. The real-time directions and instructions can involve accessing and processing (via a controller) sensor data such as a global position sensor, motion sensor, accelerometer, etc.

In step S305, a transition message to transition from a first expected state of the driver to a second expected state of the driver is generated. The transition messages generated can be, for example, the first transition message MSG1 indicating the first expected state "Disengage Autonomous Mode" and the second transition message MSG2 with the second expected state "Autonomous Mode", discussed with respect to FIG. 2C. An expected state is a state the driver is expected to occupy when driving along a particular route segment (e.g., route segment 301 in FIG. 2B). The expected state can be determined during the route determination by the server 20 or the navigation apparatus 10 using specifications of the autonomous vehicle and vehicles that will be encountered while driving along a particular route, road conditions, an urban setting, traffic conditions, information collected from the sensor of the autonomous vehicle, other information that can be used in a route determination. For example, a straight interstate highway or road with low vehicle traffic can have an expected state of hands free, eyes-off-road, or sleeping. A winding road, a road with heavy traffic, or roads with several intersections can have an expected state as manual or hands free. Further, in step S305, an appended message can be generated, as discussed with respect to FIG. 2C.

In step S307, the transition messages are updated on the third screen 400 in real-time while driving along a route segment. For example, the second transition message MSG2 is updated on the third screen 400 when the autonomous vehicle is at the transition point C.

Further, in step S309, a current driver state can be monitored using the sensors installed in the autonomous vehicle. Different types of sensors are discussed with respect to FIG. 1. For example, sensors to monitor driver state can be: a position sensor to detect the driver's hand position on the steering 105, a camera used to detect eyes-off-road, and/or a seat position sensor to detect reclining position of the seat, etc.

In step S311, the navigation apparatus 10 determines whether the current driver state is similar to the expected state (e.g., the manual state along the third route segment 305) at the current location along the route (e.g., the route R1). If so, the system keeps monitoring the driver state, in step S309. However, if the current driver state is not similar to the expected state, an alert message can be generated, in step S313. The alert message may not be generated under certain conditions such as the driver 110 has his/her hands on the steering 105 when the expected state is hands free. The alert message can be a visual instruction on the third screen 400, an audio instruction, or a vibration in the seat 111 or the steering 105 etc.

Figure 4:
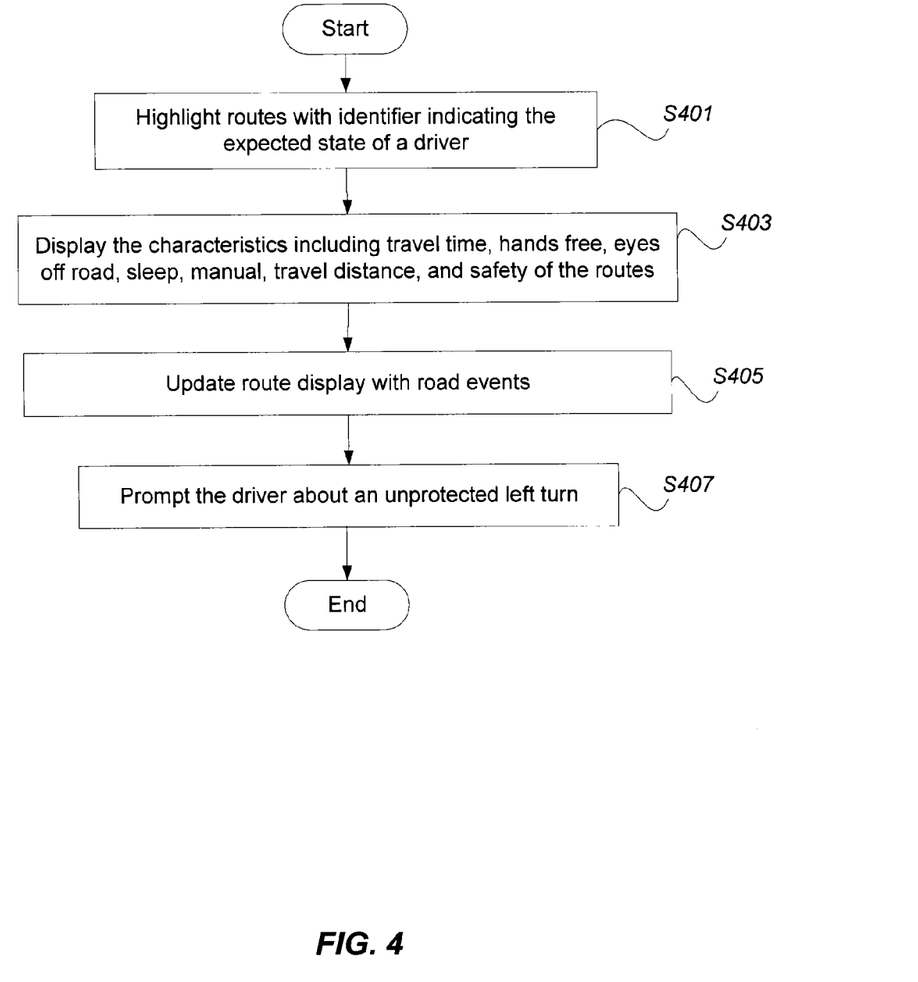
FIG. 4 is a flow chart of a second display process for the second screen of the navigation apparatus according to an embodiment of the present disclosure.

FIG. 4 is a flow chart of a second display process for the second screen 300 performed by the navigation apparatus 10 according to an embodiment of the present disclosure. The second display process starts when the user selects one or more routes on the first screen 200. In step S401, the routes selected by the user are highlighted with identifiers indicating the expected state of a driver along the route. For example, the route segments 301, 303, 305 of the route R1, as discussed with respect to FIG. 2B.

In step S403, the characteristics including the travel time, the hands free state, the eyes-off-road state, the sleeping state, the manual state, the travel distance, and the safety of the routes are displayed below an overview of the map for each of the selected route R1, R2, and R3.

In step S405, road events can be identified and updated on the second screen 300. The road events can be an accident, repairs, bad weather conditions, etc. The road events can be identified by the server 20 or the controller of the navigation apparatus 10 based on data received from the sensors of the autonomous vehicle and transmitted to the second screen 300.

In step S407, the second screen can be updated with prompts about unprotected left turns. The second screen can receive unprotected left turns information from the server 20 or the controller of the navigation apparatus 10 based on data received from the sensors of the autonomous vehicle. When the unprotected left turn is detected, the driver can be alerted to keep the hands on the wheel and the eyes on the road.

Figure 5:
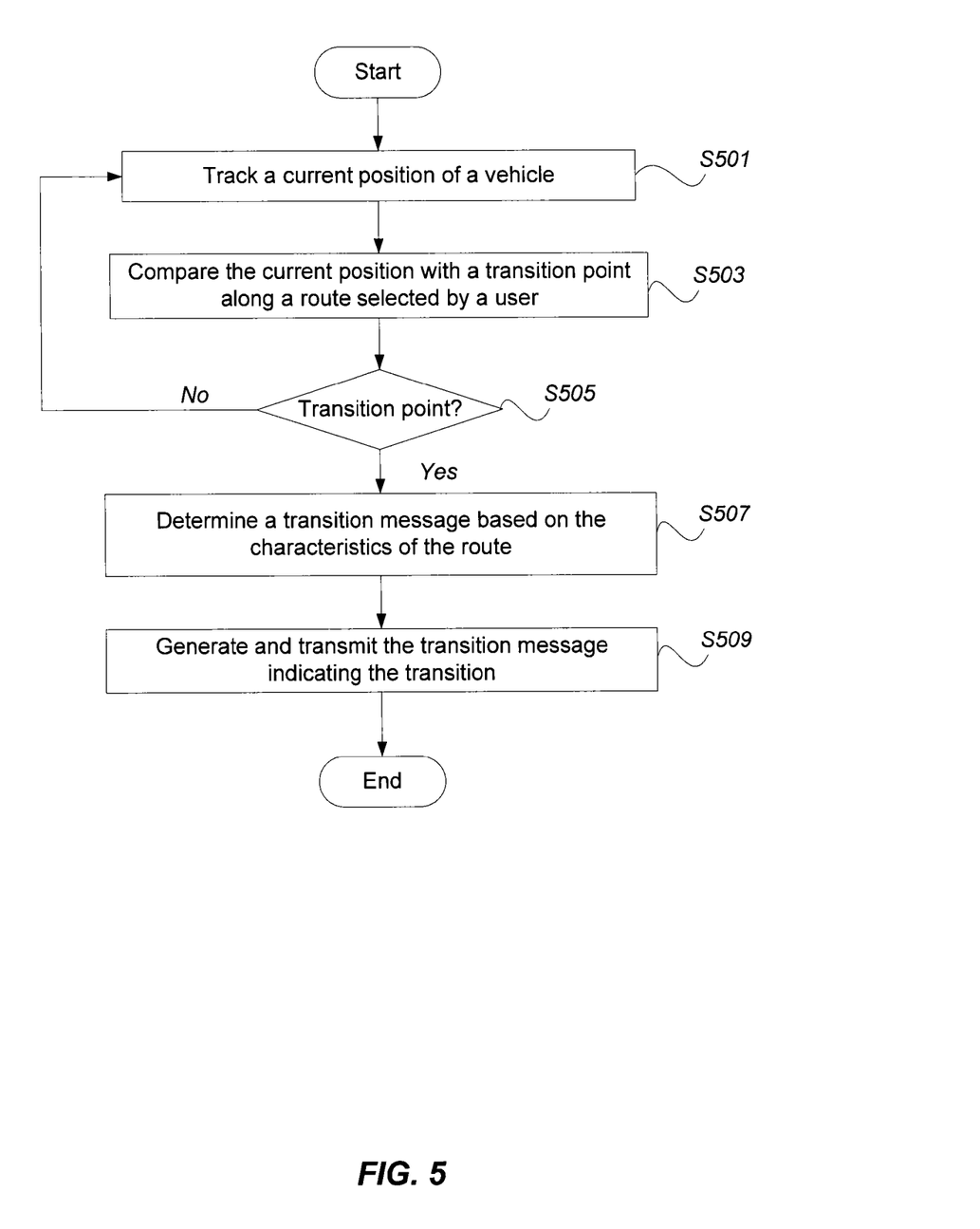
FIG. 5 is a flow chart of a third display process for the third screen of the navigation apparatus according to an embodiment of the present disclosure.

FIG. 5 is a flow chart of a third display process for the third screen 400 performed by the navigation apparatus 10 according to an exemplary embodiment of the present disclosure. The third display process starts when the user selects a route on the first screen 200 or the second screen 300. In step S501, the navigation apparatus 10 starts tracking the current position of the autonomous vehicle. The current position can be marked on the map of the third screen 400. The current position can be determined based on the GPS installed on the autonomous vehicle. In step S503, the current position is compared with transition points along the route selected by the user. The transition points are a part of the characteristics of the route determined by the server 20 as discussed in step S305 of FIG. 3. Upon comparison, in step S505, a determination is made if the current position of the autonomous vehicle is close to a transition point (e.g., the second transition point C) along the route (e.g., the real-time route 401) selected by the user. If the current position is not in close proximity of the transition point (e.g., the transition point C), the third display process continuous from the step S501.

On the other hand, if the current position is in close proximity of the transition point (e.g., the second transition point C), a transition message (e.g., the second transition message MSG2) is determined based on the characteristics of the route at the transition point, in step S507.

In step S509, the transition message with an expected state the driver 110 should occupy is determined based on the characteristics of the route determined by the server 20. In step S509, the transition message is generated and transmitted to the third screen 400. The transition message (e.g., the transition message MSG2) can be generated as a visual instruction, as discussed in FIG. 2C. Alternatively or in addition, the transition message can be in an audio form.

Furthermore, an appended message can be generated and transmitted to the third screen 400 as discussed with respect to FIG. 2C.

Further, as live updating can occur during the driving process, the allowed driver states can be updated and option to rerouting can be prompted on the third screen 400. For example, in case of a truck jackknife, the allowed state can be changed from the sleeping to the manual mode and the driver can be alerted via visual, audio, vibrations in the steering or seat, etc.

Figure 6:
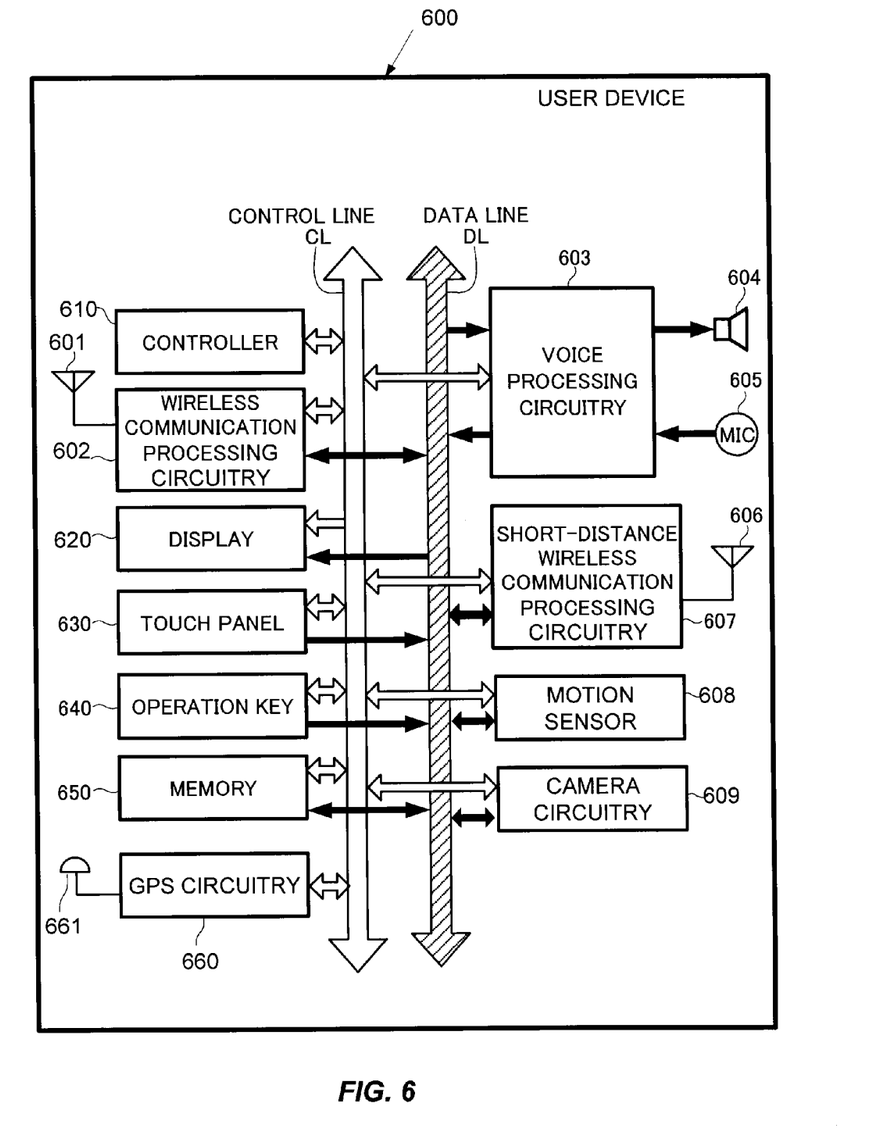
FIG. 6 is a detailed block diagram illustrating an exemplary user device according to certain embodiments of the present disclosure.

FIG. 6 is a detailed block diagram illustrating an exemplary user device 600 according to certain embodiments of the present disclosure. The user device 600 is an exemplary representation of the navigation apparatus 10. In certain embodiments, the user device 600 may be a smartphone. However, the skilled artisan will appreciate that the features described herein may be adapted to be implemented on other devices (e.g., a laptop, a tablet, a server, an e-reader, a camera, a navigation device, etc.). The exemplary user device 600 includes a controller 610 and a wireless communication processing circuitry 602 connected to an antenna 601. A speaker 604 and a microphone 605 are connected to a voice processing circuitry 603.

The controller 610 executes a software application to perform the functions or processes discussed with respect to FIGS. 2A, 2B, 2C, 3, 4, and 5. The controller 610 may include one or more Central Processing Units (CPUs), and may control each element in the user device 600 to perform functions related to communication control, audio signal processing, control for the audio signal processing, still and moving image processing and control, and other kinds of signal processing. The controller 610 may perform these functions by executing instructions stored in a memory 650. For example, the processes illustrated in FIGS. 3-5 may be stored in the memory 650 and executed based on the user inputs received via the first screen 200, the second screen 300, and the third screen 400. Alternatively or in addition to the local storage of the memory 650, the functions may be executed using instructions stored on an external device such as the server 20 accessed on a network or on a non-transitory computer readable medium.

The memory 650 includes but is not limited to Read Only Memory (ROM), Random Access Memory (RAM), or a memory array including a combination of volatile and non-volatile memory units. The memory 650 may be utilized as working memory by the controller 610 while executing the processes and algorithms of the present disclosure. Additionally, the memory 650 may be used for long-term storage, e.g., of image data and information related thereto. The memory 650 may be configured to store the battle view information, operation view information and list of commands.

The user device 600 includes a control line CL and data line DL as internal communication bus lines. Control data to/from the controller 610 may be transmitted through the control line CL. The data line DL may be used for transmission of voice data, display data, etc.

The antenna 601 transmits/receives electromagnetic wave signals between base stations for performing radio-based communication, such as the various forms of cellular telephone communication. The wireless communication processing circuitry 602 controls the communication performed between the user device 600 and other external devices such as the server 20 via the antenna 601. The wireless communication processing circuitry 602 may control communication between base stations for cellular phone communication.

The speaker 604 emits an audio signal corresponding to audio data supplied from the voice processing circuitry 603. The microphone 605 detects surrounding audio and converts the detected audio into an audio signal. The audio signal may then be output to the voice processing circuitry 603 for further processing. The voice processing circuitry 603 demodulates and/or decodes the audio data read from the memory 650 or audio data received by the wireless communication processing circuitry 602 and/or a short-distance wireless communication processing circuitry 607. Additionally, the voice processing circuitry 603 may decode audio signals obtained by the microphone 605.

The exemplary user device 600 may also include a display 620, a touch panel 630, an operation key 640, and a short-distance communication processing circuitry 607 connected to an antenna 606. The display 620 may be a Liquid Crystal Display (LCD), an organic electroluminescence display panel, or another display screen technology. In addition to displaying still and moving image data, the display 620 may display operational inputs such as the route buttons 201-204, used for control of the user device 600. The display 620 may additionally display a GUI having multiple screens as shown in FIGS. 2A-2C, for a user to control aspects of the user device 600 and/or other devices. Further, the display 620 may display characters and images (e.g., an overview of the map in FIGS. 2B and 2C) received by the user device 600 and/or stored in the memory 650 or accessed from an external device on a network such as a camera. For example, the user device 600 may access a network such as the Internet and display text and/or images transmitted from a Web server.

The touch panel 630 may include a physical touch panel display screen and a touch panel driver. The touch panel 630 may include one or more touch sensors for detecting an input operation on an operation surface of the touch panel display screen. The touch panel 630 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 630 may detect when the stylus approaches/contacts the operation surface of the touch panel display (similar to the case in which a finger is used for the touch operation).

In certain aspects of the present disclosure, the touch panel 630 may be disposed adjacent to the display 620 (e.g., laminated) or may be formed integrally with the display 620. For simplicity, the present disclosure assumes the touch panel 630 is formed integrally with the display 620 and therefore, examples discussed herein may describe touch operations being performed on the surface of the display 620 rather than the touch panel 630. However, the skilled artisan will appreciate that this is not limiting.

For simplicity, the present disclosure assumes the touch panel 630 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 630 may include transparent electrode touch sensors arranged in the X-Y direction on the surface of transparent sensor glass.

The touch panel driver may be included in the touch panel 630 for control processing related to the touch panel 630, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel 630 may detect a position of a user's finger around an edge of the display panel 620 (e.g., gripping a protective case that surrounds the display/touch panel). Signals may be transmitted by the touch panel driver, e.g. in response to a detection of a touch operation, in response to a query from another element based on timed data exchange, etc.

The touch panel 630 and the display 620 may be surrounded by a protective casing, which may also enclose the other elements included in the user device 600. In certain embodiments, a position of the user's fingers on the protective casing (but not directly on the surface of the display 620) may be detected by the touch panel 630 sensors. Accordingly, the controller 610 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 610 may be configured to detect which hand is holding the user device 600, based on the detected finger position. For example, the touch panel 630 sensors may detect a plurality of fingers on the left side of the user device 600 (e.g., on an edge of the display 620 or on the protective casing), and detect a single finger on the right side of the user device 600. In this exemplary scenario, the controller 610 may determine that the user is wearing the user device 600 with his/her right hand because the detected grip pattern corresponds to an expected pattern when the user device 600 is wearing only with the right hand.

The operation key 640 may include one or more buttons (e.g., the route button 201-204) or similar external control elements (e.g., the button inputs 103 in FIG. 1), which may generate an operation signal based on a detected input by the user. In addition to outputs from the touch panel 630, these operation signals may be supplied to the controller 610 for performing related processing and control. In certain aspects of the present disclosure, the processing and/or functions associated with external buttons and the like may be performed by the controller 610 in response to an input operation on the touch panel 630 display screens rather than the external button, key, etc. In this way, external buttons on the user device 600 may be eliminated in lieu of performing inputs via touch operations, thereby improving water-tightness.

The antenna 606 may transmit/receive electromagnetic wave signals to/from other external apparatuses, and the short-distance wireless communication processing circuitry 607 may control the wireless communication performed between the other external apparatuses. Bluetooth, IEEE 802.11, and near-field communication (NFC) are non-limiting examples of wireless communication protocols that may be used for inter-device communication via the short-distance wireless communication processing circuitry 607.

The user device 600 may include a motion sensor 608. The motion sensor 608 may detect features of motion (i.e., one or more movements) of the user device 600. For example, the motion sensor 608 may include an accelerometer to detect acceleration, a gyroscope to detect angular velocity, a geomagnetic sensor to detect direction, a geolocation sensor to detect location, etc., or a combination thereof to detect motion of the user device 600. In certain embodiments, the motion sensor 608 may generate a detection signal that includes data representing the detected motion. For example, the motion sensor 608 may determine a number of distinct movements in a motion (e.g., from start of the series of movements to the stop, within a predetermined time interval, etc.), a number of physical shocks on the user device 600 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 610, whereby further processing may be performed based on data included in the detection signal. The motion sensor 608 can work in conjunction with a Global Positioning System (GPS) circuitry 660.

The user device 600 may include a camera circuitry 609, which includes a lens and shutter for capturing photographs of the surroundings around the user device 600. In an embodiment, the camera circuitry 609 captures surroundings of an opposite side of the user device 600 from the user. The images of the captured photographs can be displayed on the display panel 620. A memory circuitry saves the captured photographs. The memory circuitry may reside within the camera circuitry 609 or it may be part of the memory 650. The camera circuitry 609 can be a separate feature attached to the user device 600 or it can be a built-in camera feature. Furthermore, the camera circuitry 609 can be configured to detect features of motion (i.e., one or more movements) of the user device 600.

The software application executed on the user device 600 is an application that requests data processing from the server 20 via a wireless network. The server 20 includes a storage controller that manages the database on a disk and the query application manager that executes SQL (structured query language) statements against this data on the disk or the database. The query application manager 650 also implements processing functions (e.g., query syntax analysis, optimization, and execution plan generation) as well as a simple network communication function to send and receive signal from a network controller.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. A navigation apparatus for an autonomous vehicle comprising:
   circuitry configured to
      receive, via a network, at least one route between a start location and a destination,
      display the at least one route on a first screen that allows selection of a first set of routes from the at least one route,
      receive, via the network, a plurality of characteristics for each of the at least one route, each characteristic of the plurality of characteristics is associated with a measure and a longest block within which each characteristic can be performed continuously,
      divide a route of the at least one route to generate a plurality of segments based on the plurality of characteristics, a first segment is highlighted with a first identifier corresponding to a first characteristic of the plurality of characteristics and a second segment is highlighted with a second identifier corresponding to a second characteristic of the plurality of characteristics,
      display the first set of routes, the plurality of characteristics for the first set of routes, the measure, and the longest block corresponding to the plurality of characteristics on a second screen, and
      display a real-time route selected from the first set of routes on a third screen.

2. The navigation apparatus according to claim 1, wherein the plurality of characteristics include a travel time, a travel distance, a hands free state, an eyes-off-road state, a sleeping state, a reclining state, a seat forward state, a manual state, a safety factor and a fuel economy factor.

3. The navigation apparatus according to claim 1, wherein the at least one route displayed on the first screen includes a summary of each routes of the at least one route.

4. The navigation apparatus according to claim 3, wherein the summary is based on at least one measure of the plurality of characteristic.

5. The navigation apparatus according to claim 1, wherein the first identifier or the second identifier of the plurality of segments are based on a color-coding scheme to identify the first segment or the second segment.

6. The navigation apparatus according to claim 5, wherein a first color identifies the first segment having the first characteristic and a second color identifies the second segment having the second characteristic.

7. The navigation apparatus according to claim 1, wherein the measure is at least one of a time and a distance.

8. The navigation apparatus according to claim 7, wherein the circuitry is further configured to display at least one transition point on the real-time route, wherein each transition point corresponds to a start of a segment of the plurality of segments associated with the real-time route.

9. The navigation apparatus according to claim 8, wherein the number of transition points is substantially equal to the number of segments in the plurality of segments corresponding to the real-time route.

10. The navigation apparatus according to claim 1, wherein the circuitry is further configured to display a transition message at the transition point on the real-time route, the transition point corresponds to start of a segment of the plurality of segments corresponding to the real-time route.

11. The navigation apparatus according to claim 10, wherein the transition message is associated with an appended message, wherein the appended message includes the plurality of characteristics ordered based on the measure of each of the plurality of characteristics.

12. A method for navigation of an autonomous vehicle, the method comprising:
receiving, via a network, at least one route between a start location and a destination;
displaying, using processing circuitry, the at least one route on a first screen that allows selection of a first set of routes from the at least one route;
receiving, via the network, a plurality of characteristics for each of the at least one route, each characteristic of the plurality of characteristics is associated with a measure and a longest block within which each characteristic can be performed continuously,
dividing, using the processing circuitry, a route of the at least one route to generate a plurality of segments based on the plurality of characteristics, a first segment is highlighted with a first identifier corresponding to a first characteristic of the plurality of characteristics and a second segment is highlighted with a second identifier corresponding to a second characteristic of the plurality of characteristics;
displaying, using the processing circuitry, the first set of routes, the plurality of characteristics for the first set of routes, the measure and the longest block corresponding to the plurality of characteristics on a second screen; and
displaying, using the processing circuitry, a real-time route selected from the first set of routes on a third screen.

13. The method according to claim 12, further displaying, using the processing circuitry, displaying at least one transition point on the real-time route, a transition point corresponds to start of a segment of the plurality of segments associated with the real-time route.

14. The method according to claim 13, further displaying, using the processing circuitry, a transition message at the transition point on the real-time route, the transition point corresponds to start of a segment of the plurality of segments corresponding to the real-time route.

15. The method according to claim 14, wherein the transition message is associated with an appended message, where the appended message includes the plurality of characteristics ordered based on the measure of each of the plurality of characteristics.

16. A non-transitory computer-readable medium storing a program which when executed by a computer, causes the computer to perform a method for navigation of an autonomous vehicle, the method comprising:
receiving, via a network, at least one route between a start location and a destination;
displaying the at least one route on a first screen that allows selection of a first set of routes from the at least one route;
receiving, via the network, a plurality of characteristics for each of the at least one route, each characteristic of the plurality of characteristics is associated with a measure and a longest block within which each characteristic can be performed continuously;
dividing a route of the at least one route to generate a plurality of segments based on the plurality of characteristics, a first segment is highlighted with a first identifier corresponding to a first characteristic of the plurality of characteristics and a second segment is highlighted with a second identifier corresponding to a second characteristic of the plurality of characteristics;
displaying the first set of routes, the plurality of characteristics for the first set of routes, the measure and the longest block corresponding to the plurality of characteristics on a second screen; and
displaying a real-time route selected from the first set of routes on a third screen.

* * * * *

UNITED STATES PATENT AND TRADEMARK OFFICE
CERTIFICATE OF CORRECTION

PATENT NO. : 9,581,460 B1
APPLICATION NO. : 15/083648
DATED : February 28, 2017
INVENTOR(S) : John-Michael McNew et al.

It is certified that error appears in the above-identified patent and that said Letters Patent is hereby corrected as shown below:

On the Title Page

Item (54) and in the Specification, Column 1, Lines 1-4, the title information should read:
--APPARATUS AND METHOD TRANSITIONING BETWEEN DRIVING STATES DURING NAVIGATION FOR HIGHLY AUTOMATED VEHICLE--

Signed and Sealed this
Twenty-ninth Day of May, 2018

Andrei Iancu
*Director of the United States Patent and Trademark Office*